United States Patent [19]

Hellman et al.

[11] Patent Number: 4,547,831

[45] Date of Patent: Oct. 15, 1985

[54] SURGE ARRESTER

[75] Inventors: Per-Åke Hellman, Idkerberget; Lennart Stenström, Ludvika, both of Sweden

[73] Assignee: ASEA Aktiebolag, Västerås, Sweden

[21] Appl. No.: 470,779

[22] Filed: Feb. 28, 1983

[30] Foreign Application Priority Data

Mar. 4, 1982 [SE] Sweden ................................ 8201342

[51] Int. Cl.[4] ................................................ H02H 9/04

[52] U.S. Cl. .................................... 361/127; 361/117; 315/36

[58] Field of Search ............... 361/127, 126, 128, 130, 361/117; 315/36; 338/21, 20

[56] References Cited

U.S. PATENT DOCUMENTS 4,276,578 6/1981 Levinson et al. ................... 361/127

4,326,232 4/1982 Nishiwaki et al. .................. 361/127

FOREIGN PATENT DOCUMENTS 751010 5/1943 Fed. Rep. of Germany ...... 361/117

215001 5/1941 Switzerland ........................ 361/130

*Primary Examiner*—Patrick R. Salce

*Attorney, Agent, or Firm*—Watson, Cole, Grindle & Watson

[57] ABSTRACT

A surge arrester includes an elongated insulating housing comprising one or more stacks of electrically series-connected metal oxide varistor blocks arranged between a top terminal and a bottom terminal. To achieve a more even voltage distribution in the longitudinal direction of the surge arrester, the surge arrester comprises larger varistor blocks at the top terminal than at the bottom terminal.

5 Claims, 3 Drawing Figures

FIG. 1
PRIOR ART
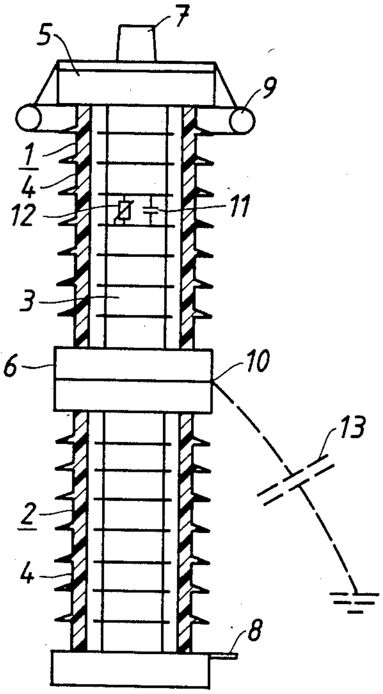
FIG. 2
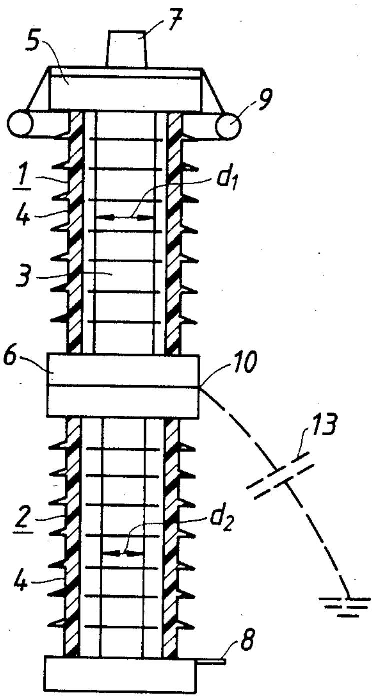
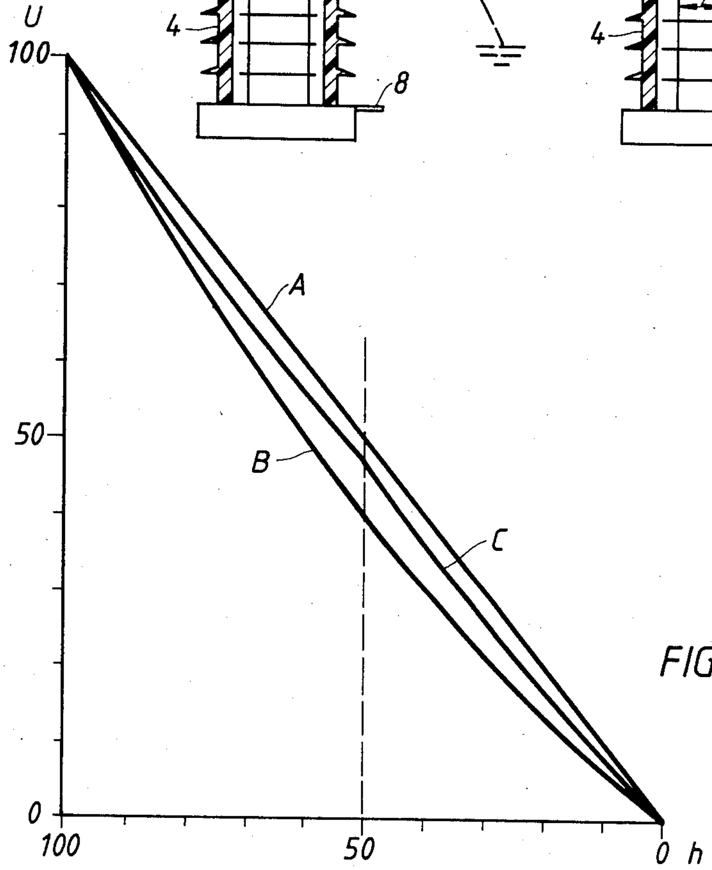
FIG. 3

SURGE ARRESTER

BACKGROUND OF THE INVENTION

1. Field of the Invention

The present invention relates to a surge arrester including an elongated insulating housing provided with a top terminal and a bottom terminal and comprising a plurality of electrically series-connected metal oxide varistor blocks arranged in a stack or in several electrically series-connected stacks between the top and the bottom terminals. The invention is primarily intended for surge arresters comprising zinc oxide varistors.

2. Prior Art

In contrast to the varistor blocks in a conventional surge arrester with silicon carbide (SiC) blocks and series-connected spark gaps, the varistor blocks in a zinc oxide (ZnO) arrester (with or without spark gaps) are continuously subjected to a certain operating voltage when the surge arrester is connected into a network which is under voltage. The surge arresters have to be dimensioned in such a way that this voltage stress, to which the ZnO blocks are continuously subjected during normal operation, does not exceed a predetermined value in any place in the surge arrester.

The voltage distribution along the prior art ZnO surge arresters is substantially determined by the self-capacitances of the varistor blocks, by the leakage capacitances of the blocks to ground, and by a grading ring usually arranged at the top of the surge arrester. The primary object of this ring is to improve the voltage distribution which has become uneven because of the leakage capacitances. However, a completely even distribution cannot normally be achieved in such a design, and, accordingly, there is a higher voltage stress at the upper part of the surge arrester than at the lower part.

The active parts of a surge arrester for outdoor use are normally enclosed in a porcelain housing with metallic end flanges. For reasons of manufacturing technique, such a porcelain housing cannot be made too long. Therefore, surge arresters for voltages higher than about 150 kV are normally constructed from two or more surge arrester units mounted on top of each other. In these multi-unit surge arresters, the leakage capacitances of the joint attachments to ground will further strengthen the uneven distribution of the voltage along the surge arrester and thus contribute to the top unit becoming relatively more highly stressed than the other units.

To achieve an acceptable voltage distribution in most long ZnO surge arresters, it is common to connect control capacitors in parallel with the ZnO blocks. However, control capacitors with a sufficiently stable capacitance for this purpose are relatively expensive and result in a noticeable increase in the cost of the surge arrester.

According to another known proposal, the voltage distribution in ZnO surge arresters can be improved without the use of control capacitors by using specially manufactured varistor blocks having self-capacitances which increase successively in a direction from the bottom terminal towards the top terminal. The capacitance of the varistor blocks can be changed by varying, during the manufacture, the addition of antimony trioxide (U.S. Pat. No. 4,276,578). Constructing surge arresters from such specially made varistor blocks, which have several different material compositions, is, however, hardly realistic in view of economical aspects.

SUMMARY OF THE INVENTION

According to the present invention, the above-mentioned problem is solved by constructing the surge arrester with larger blocks at the top than in the lower units. This results in a certain graduation of the voltage control, without having to use control capacitors, which compensates for the capacitive leakage to ground along the surge arrester.

Since a manufacturer of surge arresters must usually manufacture varistor blocks of different dimensions in order to be able economically to construct surge arresters for different current and voltage ranges, the proposal according to our invention involves no change in the normal manufacture of varistor blocks. This manufacture may, for example, comprise cylindrical blocks having the diameters 60, 67 and 75 mm and a height of about 25 mm.

Theoretically, the desired voltage distribution can be achieved by successively varying the block area in the longitudinal direction of the surge arrester. In that connection, it should, of course, be considered that the energy absorption capacity of the surge arrester is determined by the smallest block dimension occurring. For the voltage range 245–362 kV, where surge arresters are most frequently constructed with a block diameter of about 60 mm, the voltage distribution can in most cases be solved by constructing the upper unit (or units) of the surge arrester from blocks with a diameter of 67 and/or 75 mm. The difference in cost between 67 mm or 75 mm blocks and 60 mm blocks is considerably smaller than the cost of a capacitive control. Preferably, the varistor blocks at the upper end of the surge arrester will have a diameter which is at least 5% and at most 80% greater than the diameter of the varistor blocks at the lower end.

BRIEF DESCRIPTION OF THE DRAWING

The invention will be explained in greater detail with reference to the accompanying drawing, in which FIG. 1 shows a schematic cross-section of a prior art surge arrester comprising zinc oxide varistors, FIG. 2 shows, in a corresponding manner, an embodiment of the invention, and FIG. 3 shows the voltage distribution in the longitudinal direction for different surge arrester designs.

DESCRIPTION OF THE PREFERRED EMBODIMENT

The surge arrester shown in FIG. 1 includes two electrically series-connected surge arrester units 1 and 2. Each surge arrester unit comprises a plurality of cylindrical zinc oxide varistor blocks 3 arranged in a stack. The stack of varistors is arranged centrally in an elongated porcelain housing 4 having metallic end flanges 5 and 6. The two surge arrester units are mounted together coaxially and orented with the longitudinal axis in the vertical direction. The surge arrester is provided with a top terminal 7 for connection to a live line and a bottom terminal 8 for connection to ground. A grading ring 9 is suspended from the upper end of the surge arrester. The metallic flanges at the joint 10 between the surge arrester units 1 and 2 form a galvanic connection between the varistor stacks and the outer surfaces of the porcelain housing.

An ZnO block has an equivalent circuit consisting of a capacitance 11 connected in parallel with a greatly voltage-dependent resistance 12. The capacitance 11 is dependent on the composition and dimension of the block and may, for example, be between 300 and 1200 pF for each block. At normal operating voltage, the capacitive part of the leakage current is predominant, and the equivalent capacitances 11, if they were allowed to act alone, would provide a purely linear voltage distribution along the surge arrester according to line A in FIG. 3, in which U designates the voltage in percentage of the total voltage across the surge arrester, and h designates the distance from the bottom flange in percentage of the length of the surge arrester. However, between the surge arrester and ground there are distributed leakage capacitances which cause an uneven distribution of the voltage. In FIG. 1 the dashed lines indicate the leakage capacitance 13 for the metallic flanges at the joint 10, which leakage capacitance may be, for example, of the order of magnitude 10 pF. The leakage capacitances cause a higher voltage to prevail across the varistors in the upper unit of the surge arrester than across the varistors in the lower unit. The grading ring 9 leads to a certain—if not sufficient—improvement of this circumstance. The resulting voltage distribution for the surge arrester according to FIG. 1 is clear from the curve B in FIG. 3.

FIG. 2 shows an example of a possible embodiment of a surge arrester according to the present invention. In this case, the diameter $d_1$ of the varistor blocks in the uppermost surge arrester unit 1 is greater than the diameter $d_2$ of the varistor blocks in the lowermost surge arrester unit 2. The blocks in the uppermost surge arrester unit may, for example, have a diameter of 75 mm and a capacitance of about 1,100 pF, whereas the blocks in the lowermost surge arrester unit may have a diameter of 60 mm and a capacitance of about 700 pF. The curve C in FIG. 3 shows the voltage distribution for the surge arrester according to FIG. 2. As will be seen, a relatively even voltage distribution without the use of control capacitors can be achieved with this embodiment.

The invention is not restricted to the embodiment with two surge arrester units shown in FIG. 2, but the invention also comprises surge arresters with one single porcelain housing including varistor blocks of at least two different sizes, as well as surge arresters with a larger number of surge arrester units. The variation of the size of the blocks in the surge arrester can take place in a plurality of stages. For example, in a surge arrester comprising three surge arrester units mounted coaxially on each other, it is possible to use blocks having a diameter of 60 mm in the lowermost surge arrester unit, blocks having a diameter of 67 mm in the middlemost unit and blocks having a diameter of 75 mm in the uppermost surge arrester unit. It is also possible to use, within one and the same surge arrester unit, blocks of different dimensions.

We claim:

1. A surge arrester comprising a top terminal, a bottom terminal and at least one surge arrester unit connected between said top and bottom terminals, said surge arrester unit comprising an elongated electrically insulating housing and a plurality of electrically series-connected metal oxide varistor blocks arranged in a stack or in a plurality of electrically series-connected stacks in the electrically insulating housing, the varistor blocks at the top terminal of the arrester having a greater diameter than the varistor blocks at the bottom terminal of the arrester.

2. Surge arrester according to claim 1, wherein the diameter of the varistor blocks at the upper end of the surge arrester is at least 5% and at most 80% greater than the diameter of the varistor blocks at the lower end of the surge arrester.

3. A surge arrester comprising a top terminal, a bottom terminal and at least two surge arrester units electrically connected in series between said top and bottom terminals, each surge arrester unit comprising an elongated electrically insulating housing, provided with metallic flange means, and a plurality of electrically series-connected metal oxide varistor blocks arranged in a stack in the electrically insulating housing, the varistor blocks in the surge arrester unit which is nearest the top terminal having a greater diameter than the varistor blocks in the surge arrester unit which is nearest the bottom terminal.

4. Surge arrester according to claim 3, wherein the diameter of the varistor blocks at the upper end of the surge arrester is at least 5% and at most 80% greater than the diameter of the varistor blocks at the lower end of the surge arrester.

5. Surge arrester according to claim 3, wherein one and the same surge arrester unit comprises varistor blocks of different diameters.

* * * * *